(12) United States Patent
Yoshino

(10) Patent No.: US 10,474,399 B2
(45) Date of Patent: Nov. 12, 2019

(54) IMAGE FORMING APPARATUS AND IMAGE FORMING METHOD PERFORMING IMAGE POSITION ADJUSTMENT

(71) Applicant: KONICA MINOLTA, INC., Chiyoda-ku, Tokyo (JP)

(72) Inventor: Takeshi Yoshino, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/045,944

(22) Filed: Jul. 26, 2018

(65) Prior Publication Data

US 2019/0095146 A1 Mar. 28, 2019

(30) Foreign Application Priority Data

Sep. 25, 2017 (JP) ................. 2017-183213

(51) Int. Cl.
*G06F 3/12* (2006.01)
*H04N 1/00* (2006.01)
*H04N 1/387* (2006.01)

(52) U.S. Cl.
CPC .......... *G06F 3/1208* (2013.01); *G06F 3/1256* (2013.01); *H04N 1/0044* (2013.01); *H04N 1/3873* (2013.01); *H04N 1/3875* (2013.01); *H04N 1/3878* (2013.01); *G06F 3/1204* (2013.01); *H04N 2201/0094* (2013.01)

(58) Field of Classification Search
CPC .. H04N 1/00161; H04N 1/0044; H04N 1/387; H04N 1/3872; H04N 1/3873; H04N 1/3875; H04N 1/3877; H04N 1/3878; H04N 1/393; H04N 1/3935; H04N 1/40068; H04N 1/40093; G06F 3/1204; G06F 3/1208; G06F 3/1253; G06F 3/1256
See application file for complete search history.

(56) References Cited

U.S. PATENT DOCUMENTS

| 5,377,023 | A | * | 12/1994 | Sano | G06K 15/02 |
| | | | | | 358/448 |
| 8,295,599 | B2 | * | 10/2012 | Katougi | H04N 1/3878 |
| | | | | | 382/103 |
| 8,587,818 | B2 | * | 11/2013 | Imaizumi | H04N 1/3878 |
| | | | | | 348/207.2 |

(Continued)

FOREIGN PATENT DOCUMENTS

| JP | 2014135625 A | 7/2014 |
| JP | 2017092777 A | 5/2017 |

*Primary Examiner* — Scott A Rogers
(74) *Attorney, Agent, or Firm* — Buchanan Ingersoll & Rooney PC

(57) ABSTRACT

An image forming apparatus includes an image forming section capable of forming an image on a sheet of paper based on an input image, a display section for displaying the input image, an operation section which receives a user's input operation to designate three or more arbitrary number of points inside the input image displayed on the display section as adjustment points, and designates at least one destination of the three or more adjustment points, and an image processing section which calculates each moving amount of the adjustment points from position information on the destinations of the adjustment points designated by the operation section so as to adjust a position of an image of a region enclosed by the three or more adjustment points.

12 Claims, 13 Drawing Sheets

(56) References Cited

U.S. PATENT DOCUMENTS

| | | | |
|---|---|---|---|
| 8,693,019 B2* | 4/2014 | Yanagawa | G06F 3/1208 |
| | | | 358/1.13 |
| 9,030,423 B2* | 5/2015 | Hamada | H04N 1/00381 |
| | | | 178/18.01 |
| 9,197,785 B2* | 11/2015 | Tamura | H04N 1/393 |
| 9,509,876 B2* | 11/2016 | Kikuchi | H04N 1/00737 |
| 9,740,953 B2* | 8/2017 | Miyauchi | H04N 1/3878 |
| 9,906,683 B2* | 2/2018 | Miyagi | H04N 1/3873 |
| 9,917,957 B1* | 3/2018 | Martin | G06F 3/1208 |
| 10,284,747 B2* | 5/2019 | Sakata | G03G 15/5062 |
| 2013/0293902 A1* | 11/2013 | Seto | H04N 1/3873 |
| | | | 358/1.5 |
| 2014/0192370 A1 | 7/2014 | Kurigata | |
| 2017/0142285 A1 | 5/2017 | Miyagi | |
| 2018/0173478 A1* | 6/2018 | Hayakawa | G06F 3/1208 |

* cited by examiner

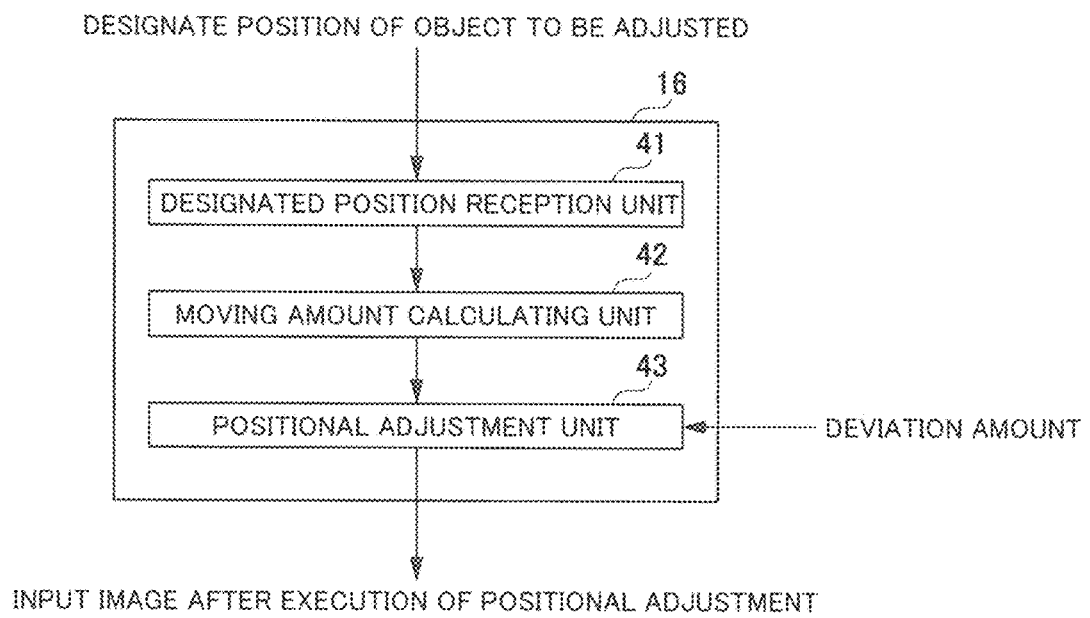

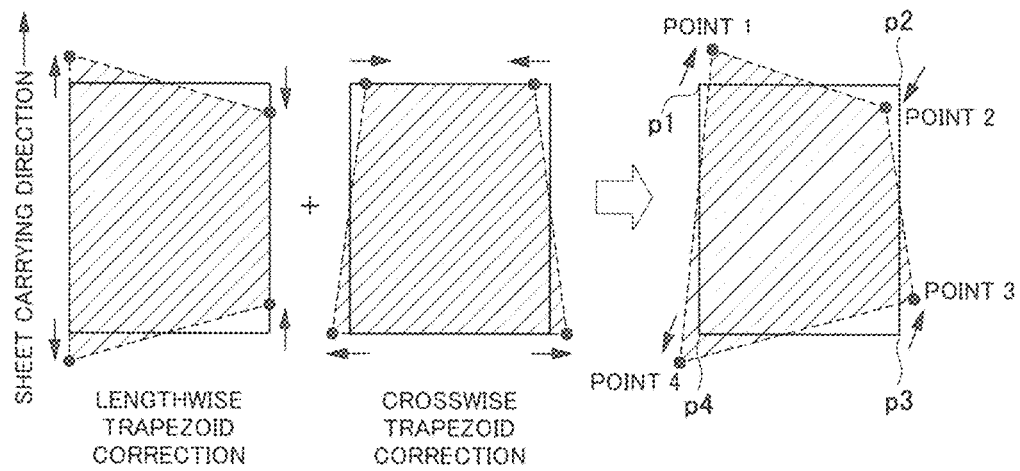

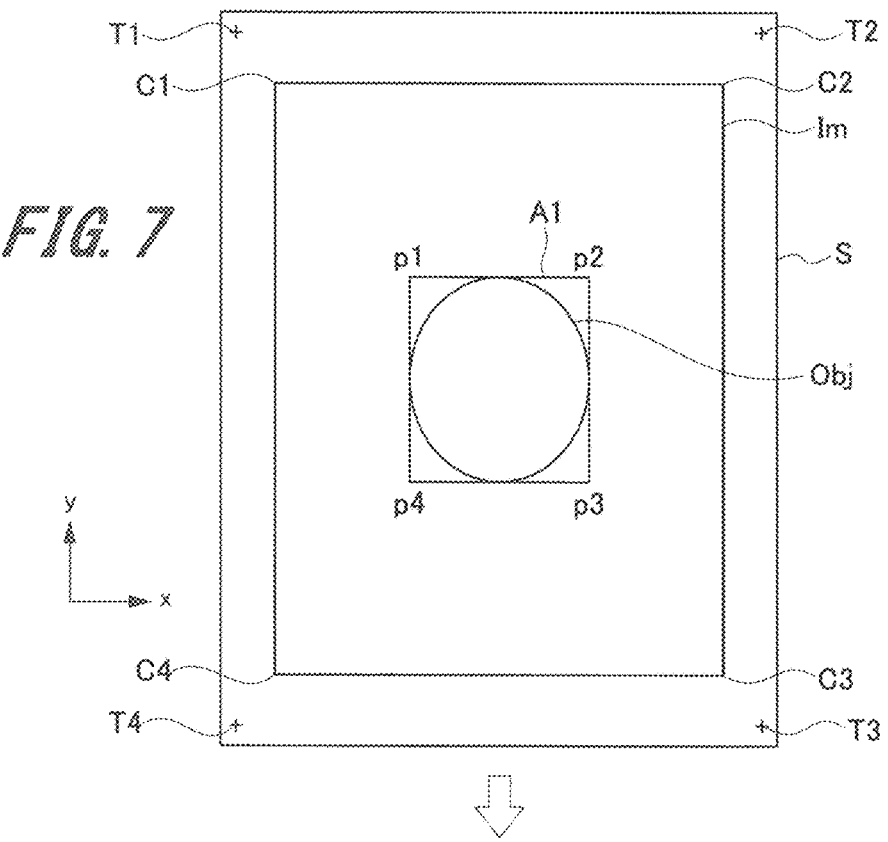
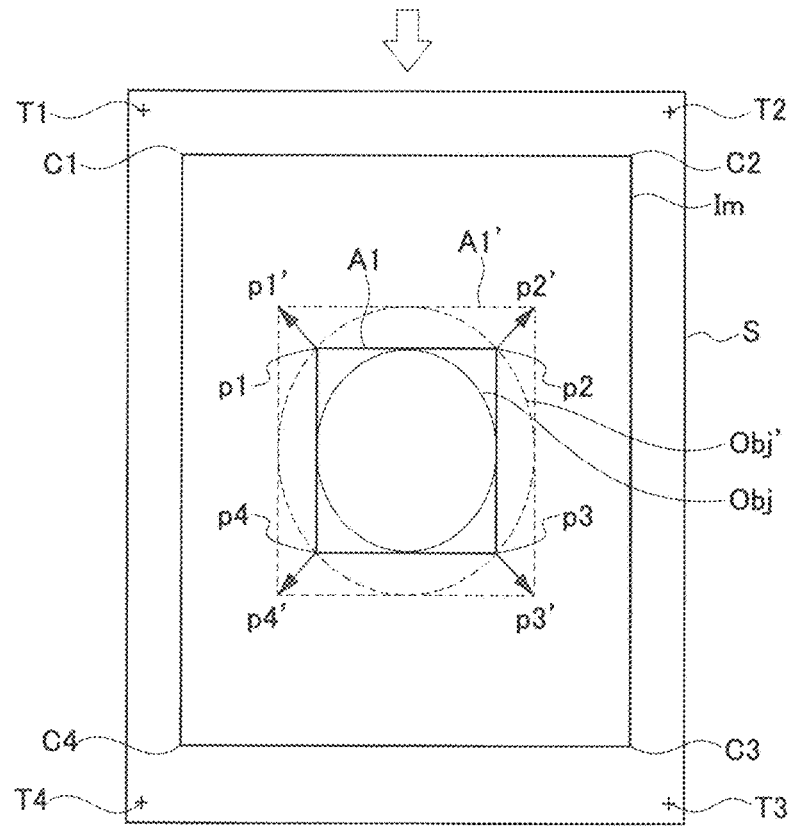
FIG. 7

FIG. 9
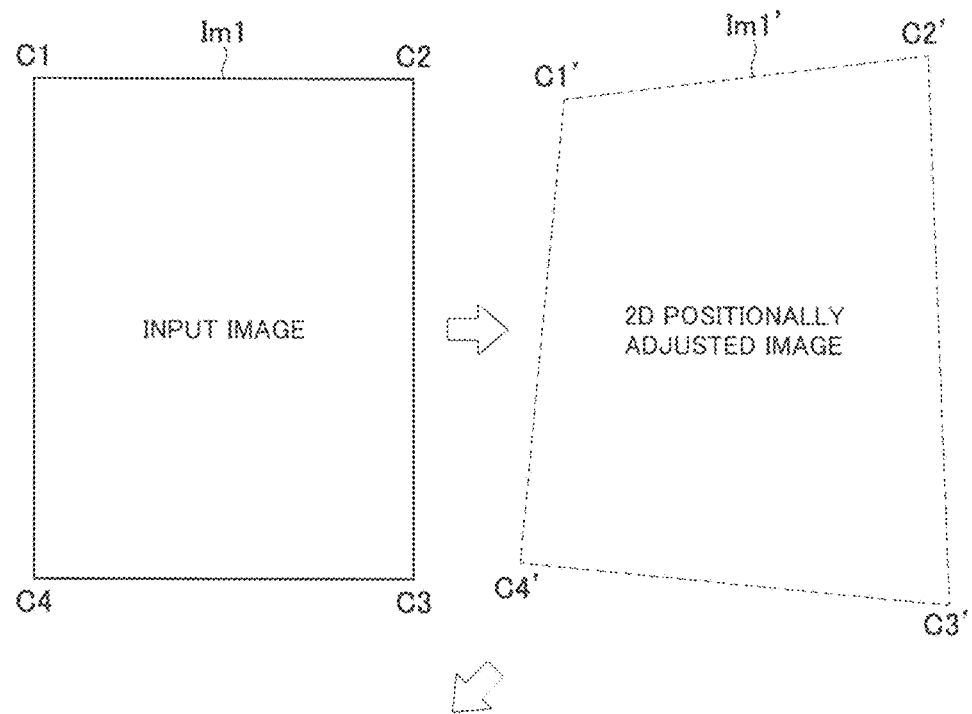
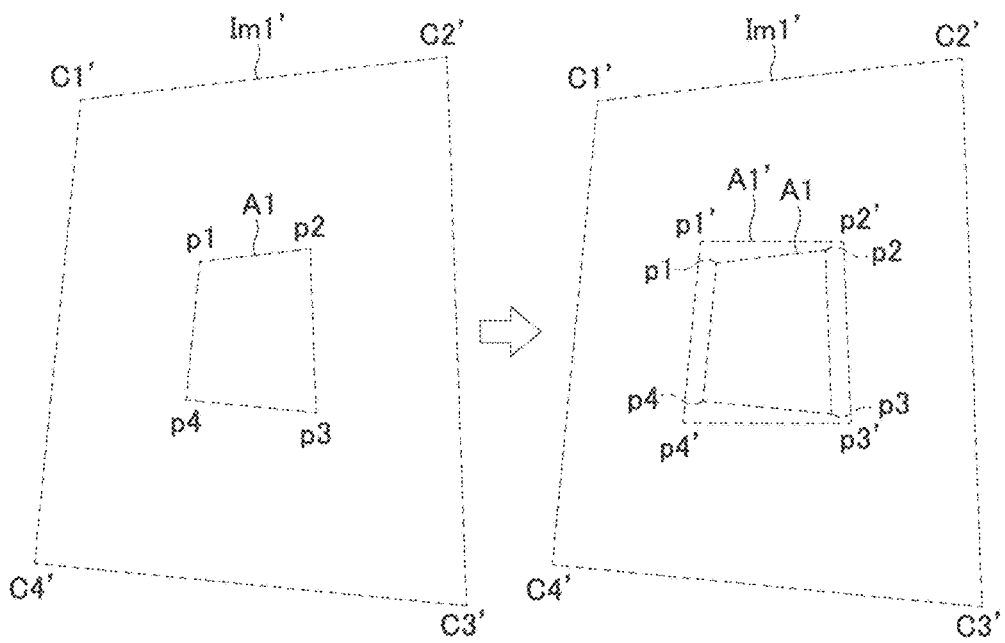

IMAGE FORMING APPARATUS AND IMAGE FORMING METHOD PERFORMING IMAGE POSITION ADJUSTMENT

CROSS-REFERENCE TO RELATED APPLICATIONS

The entire disclosure of Japanese Patent Application No. 2017-183213, filed on Sep. 25, 2017, is incorporated herein by reference in its entirety.

BACKGROUND

Technological Field

The present invention relates to an image forming apparatus configured to positionally adjust an image to be formed on a sheet of paper, and an image forming method.

Description of the Related Art

A generally employed image forming apparatus executes the complicated image correction process applied to the input image, for example, the rotation correction, bow correction, variable magnification correction, crosswise trapezoid correction, or lengthwise trapezoid correction. The image correction function has been implemented by combining a plurality of image correction processes.

For example, Patent Literature 1 discloses that the correction mode is selectable between the first correction mode and the second correction mode upon printing output of the input image in accordance with the deviation amount acquired by the deviation amount acquisition section. In the first correction mode, the geometric correction section is operated to execute the correction both in the main scanning direction and the sub scanning direction. Meanwhile, in the second correction mode, the geometric correction section is operated to execute the correction in the main scanning direction, and the writing timing control section is operated to execute the correction in the sub scanning direction.

Patent Literature 2 discloses the image deformation processor which ensures to prevent degradation of image quality irrespective of superposition of a plurality of deformation processes.

CITATION LIST

Patent Literature

Patent Literature 1: Japanese Unexamined Patent Application Publication No. 2017-92777
Patent Literature 2: Japanese Patent No. 5790948 (Japanese Unexamined Patent Application Publication No. 2014-135625)

SUMMARY

The generally employed image forming apparatus having the above-described image correction function is capable of positionally adjusting four corners of the input image to arbitrarily set positions. However, the image correction process includes complicated correction processes such as the rotation correction and the bow correction, which is far from the simple movement of the image position. Although the respective image positions of the four corners of the input image may be aligned with the target positions by executing those correction processes, it may possibly fail to align the position of an object image inside the input image, which is regarded as more essential. Assuming that the region around the end of the input image (front surface image, back surface image), (background image, for example) is formed as the complicated image with a large volume of information such as a nature description image, and the solid spherical object exists at the center of the input image, alignment of the spherical object becomes more important than alignment of the end parts of the input image for positionally aligning the spherical object on the front surface with the one on the back surface of the sheet of paper.

It is an object of the present invention to provide the method which allows easy adjustment of the print position of the region inside the input image, which is required to be positionally aligned.

To achieve at least one of the above-described objects, according to an aspect of the present invention, an image forming apparatus reflecting one aspect of the present invention includes an image forming section capable of forming an image on a sheet of paper based on an input image, a display section for displaying the input image, an operation section which receives a user's input operation to designate three or more arbitrary number of points inside the input image displayed on the display section as adjustment points, and designates at least one destination of the three or more adjustment points, and an image processing section which calculates each moving amount of the adjustment points from position information on the destinations of the adjustment points designated by the operation section so as to adjust a position of an image of a region enclosed by the three or more adjustment points.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a block diagram showing an exemplary structure of an image processing section of an image forming apparatus according to the first embodiment of the present invention.

FIG. 4 is an explanatory view representing examples of the correction function of the image processing section according to the first embodiment of the present invention.

FIG. 5 is an explanatory view representing the effect derived from execution of both the lengthwise trapezoid correction and the crosswise trapezoid correction according to the first embodiment of the present invention.

FIG. 7 is an explanatory view representing an exemplary image processing executed by the image processing section according to the first embodiment of the present invention.

FIG. 9 is an explanatory view representing an exemplary image processing executed by the image processing section according to a third embodiment of the present invention.

DETAILED DESCRIPTION OF EMBODIMENTS

Figure 1:
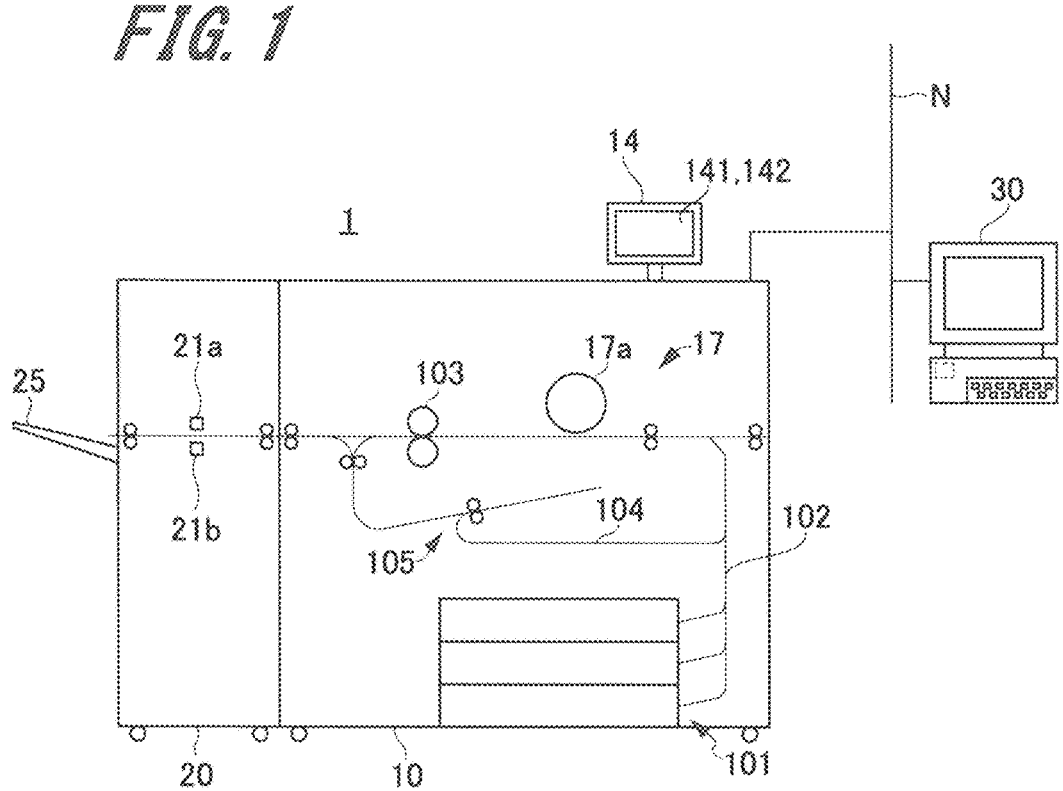
FIG. 1 is a sectional view representing an example of an entire structure of an image forming system according to a first embodiment of the present invention.

Embodiments for implementing the present invention will be described referring to the drawings. The component with substantially the same function or structure shown in the drawings will be designated with the same code, and repetitive explanation, thus will be omitted. The drawings represent specific embodiments and examples in accordance with the principle of the present invention for understanding of the present invention, and are not intended to be used for the restrictive interpretation of the present invention.

1. First Embodiment

[Entire Structure of Image Forming System]

FIG. 1 is a sectional view of an example of the entire structure of an image forming system according to a first embodiment of the present invention.

An image forming system 1 includes an image forming apparatus 10 that executes the process of forming an image on a sheet of paper based on an input job, and a reader apparatus 20 that reads the image formed (hereinafter referred to as "output image") on the sheet of paper. The reader apparatus 20 is connected to a rear side of the image forming apparatus 10. The image forming apparatus 10 is connected to a client terminal 30 inter-communicably via a network N such as LAN. For example, a personal computer is applicable to the client terminal 30. Based on input operations of a user, the client terminal 30 generates input image data (print data) for document creation or printing through the image creation application. The client terminal 30 includes a function for generating a print job that contains print data and print setting information (which may be called "job ticket") so as to be output to the image forming apparatus 10.

The image forming system 1 allows carriage of a sheet of paper between the image forming apparatus 10 and the reader apparatus 20 in an inter-communicable manner. In the present embodiment, the reader apparatus 20 executes the in-line processing in synchronization with the image forming apparatus 10.

An operation display section 14 is disposed above the image forming apparatus 10. The operation display section 14 is formed by laminating a display unit 142 such as a display panel and an operation unit 141 such as a touch panel so as to allow the operator to operate and display the information.

A plurality of sheet feed trays 101 are disposed in the lower part of the image forming apparatus 10. The image forming apparatus 10 includes a carrier path 102 for carrying the sheet of paper fed from any one of the sheet feed trays 101. An image forming section 17 is disposed on the middle of the carrier path 102. For example, the image forming section 17 includes an image forming unit constituted by a not shown exposure unit, a not shown developing unit, a photosensitive drum 17a and the like so that a toner image is formed on the sheet of paper. It is possible to employ the image forming unit that supports the multi-color mode (cyan, magenta, yellow, black and the like).

A fixing unit 103 is disposed at the downstream side of the sheet carrying direction (simply referred to as "downstream side") of the image forming section 17, and allows carriage of the sheet of paper on which the toner image is formed. The fixing unit 103 fixes the toner image transferred onto the front surface of the sheet of paper through the pressurizing process and the heating process. The sheet of paper subjected to the fixation process is carried to the reader apparatus 20 or a reverse carrier path 104 by way of the carrier path 102.

The carrier path 102 is connected to the reverse carrier path 104 that is branched at the downstream side of the fixing unit 103, and joins at the upstream side of the image forming section 17. The reverse carrier path 104 includes a reverse unit 105 for reversing the sheet of paper. The sheet of paper having its front and back sides, or front and rear sides reversed is carried to the carrier path 102 at the upstream side of the image forming section 17 through the reverse carrier path 104, or carried to the carrier path 102 at the downstream side of the fixing unit 103. The sheet of paper discharged from the image forming apparatus 10 is carried into the reader apparatus 20.

Figure 2:
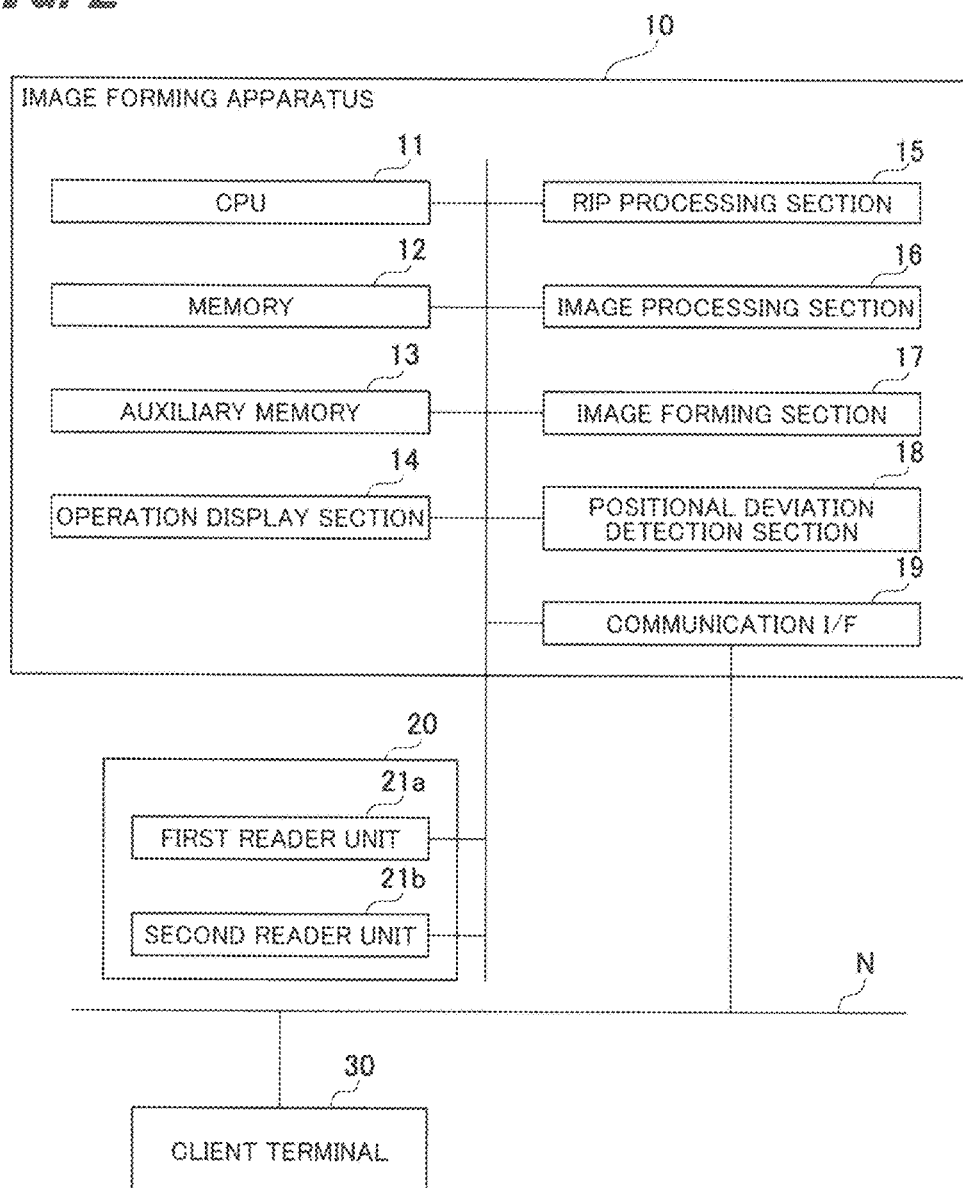
FIG. 2 is a block diagram showing an example of a hardware structure of the respective devices of the image forming system according to the first embodiment of the present invention.

The reader apparatus 20 (an example of the reader section) includes a first reader unit 21a as an upper surface scanner disposed above the carrier path on which the sheet of paper is carried, and a second reader unit 21b as a lower surface scanner disposed below the carrier path. The first reader unit 21a optically scans the upper surface of the sheet of paper that has been carried from the image forming apparatus 10 to read the information (output image) on the upper surface so that the read image data are generated. The second reader unit 21b optically scans the lower surface of the carried sheet of paper to read the information (output image) on the lower surface so that the read image data are generated. The generated read image data are sent to a CPU (Central Processing Unit) 11 as shown in FIG. 2. In the following description, when discrimination between the first reader unit 21a and the second reader unit 21b is not necessary, they will be collectively called "reader unit 21".

The above-described image forming apparatus 10 serves as the device for forming images using a 2D positional correction process. It is configured to adjust the print position of an attention region (hereinafter referred to as the "region") required to be positionally aligned inside the input image without positionally adjusting four corners of the input image as has been generally executed.

The overall structure of the image forming system 1 according to the present invention is not limited to the one as described above. For example, the system may be configured to dispose the first reader unit 21a and the second reader unit 21b of the reader apparatus 20 at the downstream side of the fixing unit 103 of the image forming apparatus 10. Specifically, the first reader unit 21a and the second reader unit 21b are disposed between the position at which the reverse carrier path 104 is branched from the carrier path 102, and an outlet of the image forming apparatus 10.

[Image Forming Apparatus]

An example of a hardware structure of the respective devices of the image forming system 1 will be described referring to FIG. 2. FIG. 2 is a block diagram representing an example of the hardware structure of the respective devices of the image forming system 1. The image forming apparatus 10 receives the print job output from the client terminal 30 via the network N, and outputs the image on the sheet of paper, which has been generated based on the print data and print setting information corresponding to the print job (hereinafter referred to as "printing process"). The image forming apparatus 10 may be an MFP (Multi Function Peripheral) machine with a plurality of functions (print function, copy function, scan function, and the like).

The image forming apparatus 10 includes a CPU 11, a memory 12, an auxiliary memory 13, an operation display section 14, a RIP processing section 15, an image processing section 16, an image forming section 17, a positional deviation detection section 18, and a communication I/F 19. The respective sections are inter-communicably connected via a system bus.

The CPU 11 serves as a central processing unit for controlling operations of the respective sections of the image forming apparatus 10, and executing arithmetic operations so as to read program codes of the software from the auxiliary memory 13 for implementing the respective functions according to the present embodiment, and execute the program. The image forming apparatus 10 may be configured to include such a processor as an MPU (Micro-Processing Unit) in place of the CPU 11.

The memory 12 is a main storage unit configured to temporarily receive written variables and parameters generated in the arithmetic operation. The memory 12 may be in the form of such a unit as a RAM.

The auxiliary memory 13 as a storage unit that supports the memory 12 is generally configured to store the data substantially persistently for a long period of time. The auxiliary memory 13 may be configured to store the program for functionalizing the image forming apparatus 10 in addition to the OS and various parameters.

The operation display section 14 is formed by laminating the touch panel as the operation unit 141 and the flat panel display as the display unit 142, for example. The operation display section 14 generates an operation signal in accordance with the operation content input from the user, and supplies the thus generated operation signal to the CPU 11. The operation display section 14 displays the processing results of the CPU 11. Furthermore, upon reception of the user's input operation, the operation display section 14 (operation unit 141) designates three or more arbitrary number of points inside the input image displayed on the display unit 142 as adjustment points, and executes the process of designating at least one destination of those three or more adjustment points. The CPU 11 sends information on the position (adjustment point) designated by the operation display section 14 to the image processing section 16.

The RIP processing section 15 reflects the print setting information in the print data, and converts (RIP processing) the data into the language (PDL: Page Description Language) that can be identified by the image forming apparatus 10. The resultant language is then output. For example, PCL and PostScript may be used as the language that can be identified by the image forming apparatus 10. The RIP processing section 15 sends the RIP processed (rasterized) input image to the image processing section 16.

The image processing section 16 calculates each moving amount (including the information on the moving direction) of the respective adjustment points based on the position information of each destination of the respective adjustment points inside the input image designated by the operation unit 141, and executes the process of positionally adjusting the image of the region enclosed by three or more designated adjustment points. In the following description, the positional adjustment of the image of the region will be expressed as the positional adjustment of the region. The image processing section 16 may be configured to subject the read image data received from the reader apparatus 20 to the analog processing, the A/D conversion, the shading correction, the image compression, and the like.

The RIP processed input image after execution of the positional adjustment is supplied from the image processing section 16. Based on the above-described input image, the image forming section 17 forms the image on the sheet of paper. The image forming section 17 is formed as the printer engine.

The positional deviation detection section 18 allows the reader unit 21 of the reader apparatus 20 to read cross-shaped positional adjustment patterns T1 to T4 for positional deviation detection around four corners C1 to C4 (see FIG. 6) on the sheet of paper, printed by the image forming section 17 so as to detect each deviation amount of the respective positional adjustment patterns T1 to T4 on the read image data from the specified positions. In the above-described case, based on the deviation amounts of the positional adjustment patterns T1 to T4 detected by the positional deviation detection section 18, the image processing section 16 corrects the position of the input image to be printed on the sheet of paper. The position of the input image refers to the center of the input image, or the centroid position. The positional adjustment pattern is called "register mark".

Figure 6:
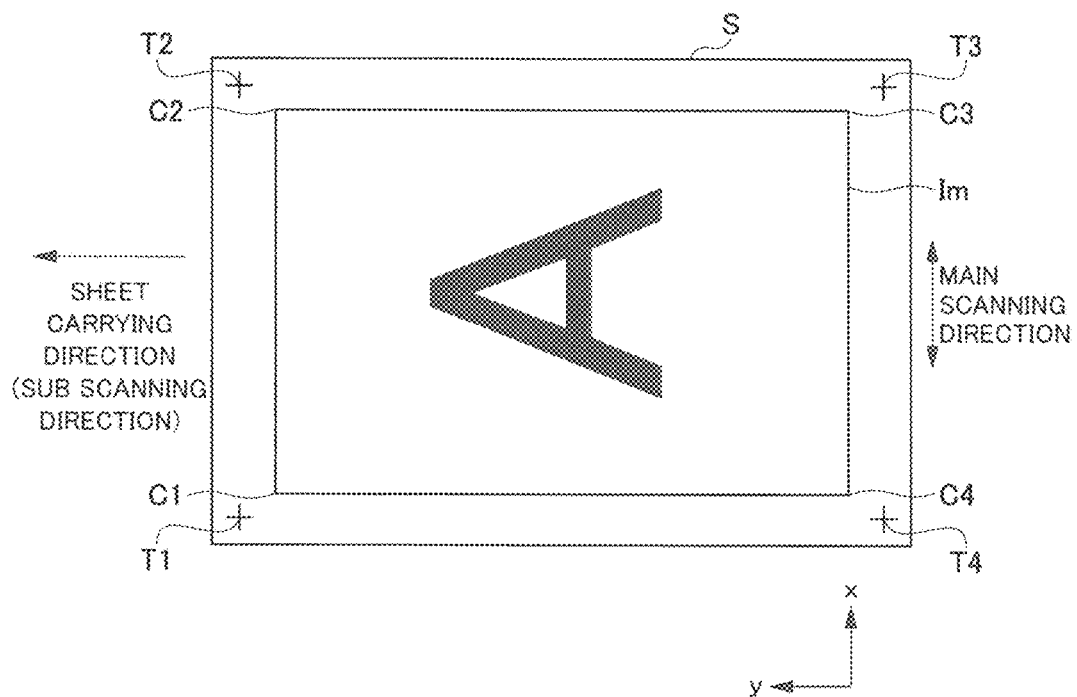
FIG. 6 is an explanatory view representing an exemplary positional adjustment pattern to be formed on the sheet of paper by an image forming section according to the first embodiment of the present invention.

The positional deviation detection section 18 is capable of detecting deviation amounts of three or more adjustment points inside an input image Im on the sheet of paper formed by the image forming section 17 from the respective specified positions (see FIG. 6). In this case, the image processing section 16 corrects the position of the input image to be formed on the sheet of paper based on the deviation amounts of the three or more adjustment points inside the input image Im, detected by the positional deviation detection section 18. The deviation amount used for the positional adjustment is to be preliminarily specified through selection between the deviation amounts of the respective positional adjustment patterns T1 to T4 from the specified positions, and the deviation amounts of the three or more adjustment points inside the input image Im from the specified positions.

The communication I/F 19 in the form of an NIC (Network Interface Card), for example, is configured to allow transmission/reception of various data to/from the client terminal 30 via the network N.

It is possible to connect the server (print controller) provided with the RIP processing section 15 and the image processing section 16 to the network N.

[Image Processing Section]

An exemplary structure of the image processing section 16 of the image forming apparatus 10 will be described referring to FIG. 3. FIG. 3 is a block diagram representing the exemplary structure of the image processing section 16 of the image forming apparatus 10. The image processing section 16 includes a designated position reception unit 41, a moving amount calculating unit 42, and a positional adjustment unit 43.

The designated position reception unit 41 receives the position (adjustment point) of an object to be adjusted inside the input image Im designated by the operation unit 141. The designated position is expressed in the xy coordinates (x, y) as shown in FIG. 6. For example, the positional adjustment pattern T1, or the corner near the positional adjustment pattern T1 on the sheet of paper S may be set to the origin (0, 0) of the xy coordinate.

The designated position reception unit 41 receives each information on the destination position of the respective designated adjustment points inside the input image. Based on the information on the destination position, the moving amount calculating unit 42 calculates each moving amount of the respective adjustment points, and sends the information on the moving amounts of the respective adjustment points to the positional adjustment unit 43.

The positional adjustment unit 43 positionally adjusts the region defined by the designated adjustment points (deform the shape of the region) based on the information on moving amounts of the respective adjustment points calculated by the moving amount calculating unit 42, and supplies the positionally adjusted input image to the image forming section 17. The positional adjustment unit 43 includes a plurality of image correction functions applied to the input image. The position of the region refers to the center of the region or the centroid position.

[Correction Function]

An example of the correction function of the positional adjustment unit 43 will be described referring to FIG. 4. FIG. 4 is an explanatory view showing examples of the correction function performed by the positional adjustment unit 43. As FIG. 4 shows, the positional adjustment unit 43 performs the correction function, for example, the rotation correction, the bow correction, the variable magnification correction, the crosswise trapezoid correction, and the lengthwise trapezoid correction. The process of positionally adjusting the image of the region enclosed by the three or more designated adjustment points may be implemented by combining the lengthwise trapezoid correction and the crosswise trapezoid correction as illustrated by FIG. 5, for example. The combination of the lengthwise trapezoid correction and the crosswise trapezoid correction allows direct and arbitrary adjustment of the correction positions of the designated points (for example, adjustment points p1 to p4 shown in FIG. 5) as indicated by arrow marks. Referring to FIG. 5, the lengthwise trapezoid correction is performed by moving the designated adjustment points or the four corners of the input image along the sheet carrying direction. The crosswise trapezoid correction is performed by moving the designated adjustment points in the direction perpendicular to the sheet carrying direction. As both the lengthwise trapezoid correction and the crosswise trapezoid correction are well known, detailed explanations of the combined correction process will be omitted.

The positional adjustment unit 43 positionally corrects the input image to be formed on the sheet of paper based on the deviation amounts of the respective positional adjustment patterns T1 to T4, detected by the positional deviation detection section 18. The positional adjustment patterns T1 to T4 will be briefly described referring to FIG. 6.

[Positional Adjustment Pattern]

The positional adjustment pattern will be described referring to FIG. 6. FIG. 6 is an explanatory view of an example of positional adjustment patterns to be formed on the sheet of paper by the image forming section 17. Referring to FIG. 6, the main scanning direction corresponds to the x direction, and the sub scanning direction (sheet carrying direction) corresponds to the y direction.

As FIG. 6 shows, the image Im is formed in an image forming region (not shown) on the sheet of paper S, and the peripheral part of the image forming region is cut. Generally, the positional adjustment pattern is formed in the part to be cut (outside the image forming region) as the periphery of the image forming region in the case of the real-time image correction. Cross-shaped images called register marks have been conventionally employed as the positional adjustment patterns T1 to T4 for positional alignment. However, arbitrary patterns may be employed without being limited to the register mark so long as the positional alignment may be made.

In the case of using the register marks as the positional adjustment patterns T1 to T4, the image forming section 17 prints each of the register marks at the position at a constant distance from the corresponding end of the four corners each as a reference position on the sheet of paper S in the main scanning direction and the sub scanning direction (sheet carrying direction) as shown in FIG. 6. Referring to the example shown in FIG. 6, the four corners C1 to C4 of the input image Im correspond to the positional adjustment patterns T1 to T4, respectively. The positional adjustment patterns T1, T2 are formed at the front end sides of the sheet of paper S, and the positional adjustment patterns T3, T4 are formed at the rear end sides of the sheet of paper S. After forming the input image Im and the positional adjustment patterns T1 to T4, the image forming apparatus 10 allows the fixing unit 103 to subject the sheet of paper S to the fixation process. After execution of the fixation process, the sheet of paper S having the positional adjustment patterns T1 to T4 formed thereon is carried to the reader unit 21 disposed at the downstream side of the carrier path 102. Then the reader unit 21 reads the information on the sheet of paper S, and generates the read image data.

Example of Image Processing (Example of Positional Adjustment)

An example of image processing executed by the image processing section 16 (positional adjustment unit 43) according to the first embodiment will be described. FIG. 7 shows an example of the image processing executed by the image processing section 16 (positional adjustment unit 43) according to the first embodiment. Referring to the example of the image processing as shown in FIG. 7, arbitrary positions inside the input image are designated as the adjustment points, and the position of the region defined by the designated adjustment points is adjusted while keeping positions of the four corners of the input image fixed. As FIG. 7 shows, the main scanning direction corresponds to the x direction, and the sub scanning direction (sheet carrying direction) corresponds to the y direction.

FIG. 7 shows the input image Im formed at the designated position on the sheet of paper S. The image of the sheet of paper S and the input image Im are displayed on the display unit 142 of the operation display section 14. The positional adjustment patterns T1 to T4 are printed around on the four corners of the image of the sheet of paper S, respectively. A region A1 is defined by the four adjustment points p1 to p4 (upper section of FIG. 7) designated by the user so that a circular image object Obj inside the input image Im is enclosed (in the circumscribed state).

Upon designation of each destination coordinate (x, y) of the adjustment points p1 to p4 through the operation unit 141, the moving amount calculating unit 42 of the image processing section 16 calculates each moving amount (manual adjustment value) of the respective adjustment points p1 to p4 from position information on the adjustment points p1 to p4, and position information on destination adjustment points p1' to p4'. Based on the respective moving amounts of the adjustment points p1 to p4, the positional adjustment unit 43 adjusts the position of the region A1 to that of a region A1' as indicated by the broken line (lower section of FIG. 7). Then the image object Obj enclosed by the region A1 is adjusted to the position of an image object Obj' as indicated by the broken line. Referring to the example shown in FIG. 7, the respective adjustment points p1 to p4 which define the region A1 are moved in the direction to increase its area. As a result, the area of the positionally adjusted region A1' (image object Obj') becomes large. The respective positional correlations between the positional adjustment patterns T1 to T4 and the four corners C1 to C4 of the input image Im are kept unchanged.

According to the above-described first embodiment, the user designates arbitrary adjustment points inside the input image Im through the operation unit 141, and further designates each destination of the respective designated adjustment points so as to ensure the positional adjustment of the desired region (image object is included) inside the input image Im in a short adjustment period. In other words, it is possible to easily adjust the print position of the region required to be aligned inside the input image Im. In this embodiment, positions of the adjustment points (for example, four points) which define the designated region inside the input image Im may be adjusted to the desired positions, respectively.

The number of the adjustment points to be designated inside the input image Im may be set to three or more, by which the region can be defined. Designation of the destination of at least one of the three or more designated adjustment points allows adjustment of the position of the region defined by the adjustment points to the desired position (or deformation of the shape of the region).

2. Second Embodiment

A second embodiment is exemplified as the case that arbitrary positions inside the input image are designated as the adjustment points, and four corners of the input image are positionally adjusted automatically in association with the positional adjustment of the region defined by those adjustment points.

Example of Image Processing (Example of Positional Adjustment)

Figure 8:
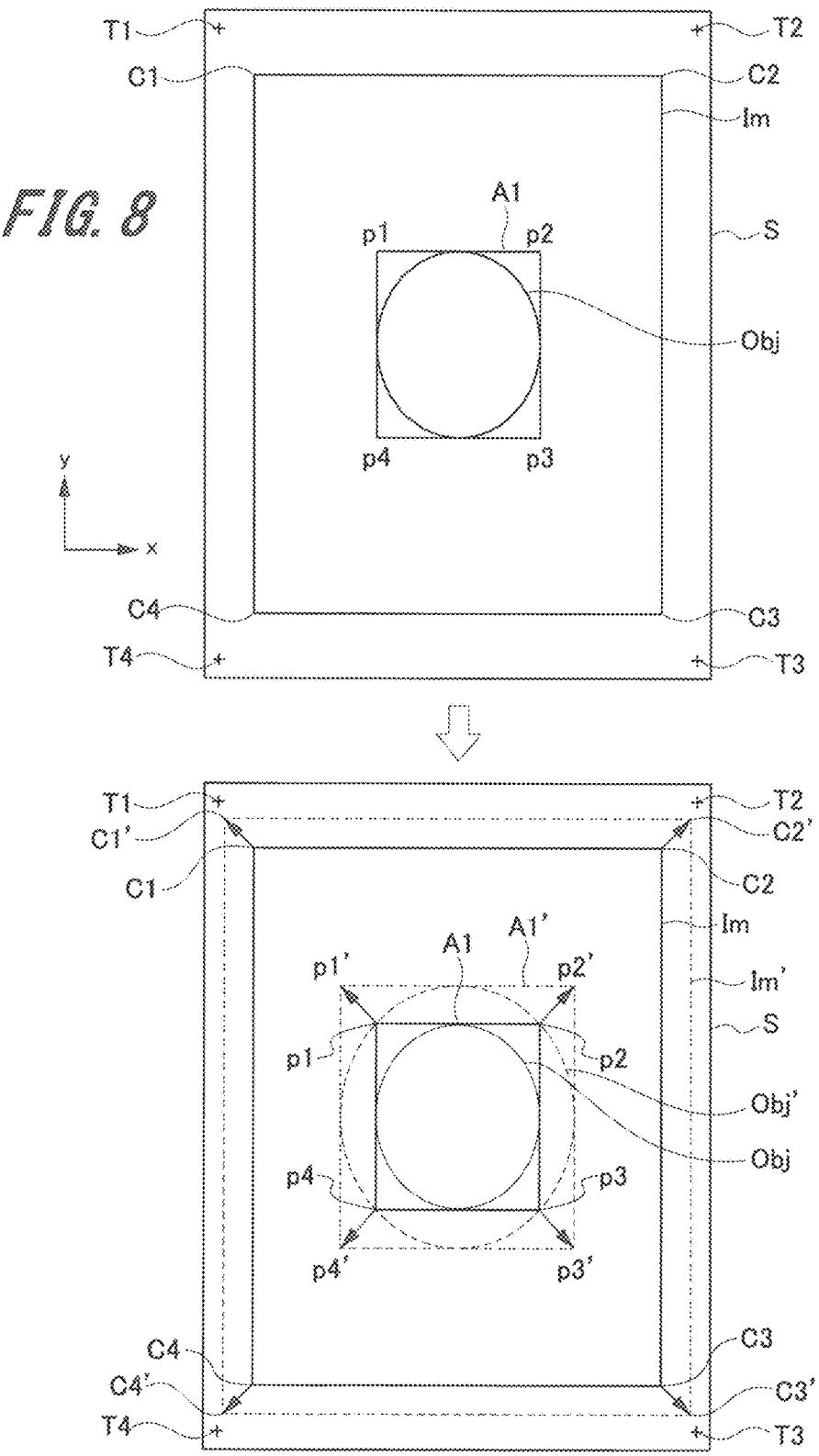
FIG. 8 is an explanatory view representing an exemplary image processing executed by the image processing section according to a second embodiment of the present invention.

FIG. 8 shows an example of image processing executed by the image processing section 16 (positional adjustment unit 43) according to the second embodiment. The input image Im shown in the upper section of FIG. 8 is the same as the input image Im shown in the upper section of FIG. 7.

Upon designation of the destination coordinates (x, y) of the respective adjustment points p1 to p4 through the operation unit 141, the moving amount calculating unit 42 of the image processing section 16 calculates the respective moving amounts (manual adjustment values) of the adjustment points p1 to p4 from the position information on the adjustment points p1 to p4, and the position information on the destination adjustment points p1' to p4'. The positional adjustment unit 43 adjusts the position of the region A1 to that of the region A1' as indicated by the broken line (lower section of FIG. 8) based on the moving amounts of the respective adjustment points p1 to p4. The image object Obj enclosed by the region A1 is adjusted to the position of an image object Obj' as indicated by the broken line. Concurrently with the positional adjustment of the designated region A1, the positional adjustment unit 43 automatically adjusts positions of the four corners C1 to C4 of the input image Im. In other words, the positional adjustment unit 43 automatically reflects the manual adjustment values of the region A1 inside the input image Im in the four corners C1 to C4 of the input image Im. This may make the respective positional correlations of the positional adjustment patterns T1 to T4 with the four corners C1 to C4 of the input image Im different in the timing between before and after the positional adjustment process.

The above-described second embodiment provides the following effects in addition to those similar to the first embodiment. In the first embodiment, only the position of the designated region A1 is adjusted, and positions of the four corners C1 to C4 of the input image Im are not adjusted. In the second embodiment, in association with the positional adjustment of the designated region A1, the four corners C1 to C4 of the input image Im are positionally adjusted automatically. In this way, the second embodiment allows the designated region A1 to be positionally linked with the input image Im', and further allows the positional correlation between the positionally adjusted region A1' and the entire input image Im' to be maintained better than the first embodiment.

Modified Example of Second Embodiment

In the above-described second embodiment, in association with the positional adjustment of the region defined by the adjustment points p1 to p4 each designated at the arbitrary position inside the input image Im, the four corners C1 to C4 of the input image Im are positionally adjusted automatically. However, the present invention is not limited to the above-described embodiment. The present invention may be implemented in accordance with a modified example of the second embodiment. The modified example allows the user to designate destination coordinates (x, y) of the four corners C1 to C4 of the input image Im so that positions of the four corners C1 to C4 are manually adjusted.

Concurrently with the process executed by the image processing section 16 for positionally adjusting the region defined by the arbitrarily designated adjustment points p1 to p4, or after execution of the positional adjustment, the user is allowed to designate the four corners C1 to C4 of the input image Im through the operation unit 141 so as to arbitrarily adjust those positions. It is possible for the user to positionally adjust the four corners C1 to C4 of the input image Im to the positions either the same as or different from those of C1' to C4' through the above-described automatic adjustment by operating the operation unit 141. In this way, the user is capable of arbitrarily adjusting the positions of the four corners C1 to C4 of the input image Im so as to adjust the position of the input image Im (or shape) to the desired position.

3. Third Embodiment

A third embodiment is exemplified as the case that the input image is subjected to the 2D positional adjustment based on the positional adjustment patterns so as to execute the positional adjustment of the region defined by the designated adjustment points inside the input image.

Example of Image Processing (Example of Positional Adjustment)

FIG. 9 shows an example of image processing executed by the image processing section 16 (positional adjustment unit 43) according to the third embodiment. As FIG. 9 shows, upon execution of the 2D positional adjustment to an input image Im1 (upper left section of FIG. 9), each position of the four corners C1 to C4 of the input image Im1 is automatically adjusted to generate a 2D positionally adjusted image Im1' defined by four corners C1' to C4' (indicated by the broken line (upper right section of FIG. 9)). At this time, the user operates the operation unit 141 to designate a region A1 defined by the adjustment points p1 to p4 inside the 2D positionally adjusted image Im1' (lower left section of FIG. 9), and designates destination coordinates (x, y) of the respective adjustment points p1 to p4. The moving amount calculating unit 42 of the image processing section 16 calculates each moving amount of the respective adjustment points p1 to p4 from the position information on the destination adjustment points p1' to p4'. The positional adjustment unit 43 adjusts the position of the region A1 to that of the region A1' based on the calculated moving amounts (lower right section of FIG. 9).

Referring to the example shown in FIG. 9, positions of the four corners C1' to C4' of the 2D positionally adjusted image Im1' are fixed. It is possible to automatically adjust the positions of the four corners C1' to C4' of the 2D positionally adjusted image Im1' in association with the positional adjustment from the region A1 to the region A1' likewise the example shown in FIG. 8.

Referring to FIGS. 7 to 9, in the case of detecting deviations of the adjustment points p1 to p4 designated by the user from the originally intended positions with time based on the image data read by the reader unit 21 of the reader apparatus 20, feedback may be made by reflecting the deviation amounts in the positions of the four corners of the input image Im (or 2D positionally adjusted image Im1'). This makes it possible to correct the positions with respect to the positional adjustment patterns T1 to T4 of the input image Im. Accordingly, the position of the region A1 defined by the adjustment points p1 to p4 may also be maintained at the position desired by the user.

[Positional Image Adjustment Setting Screen]

Figure 10:
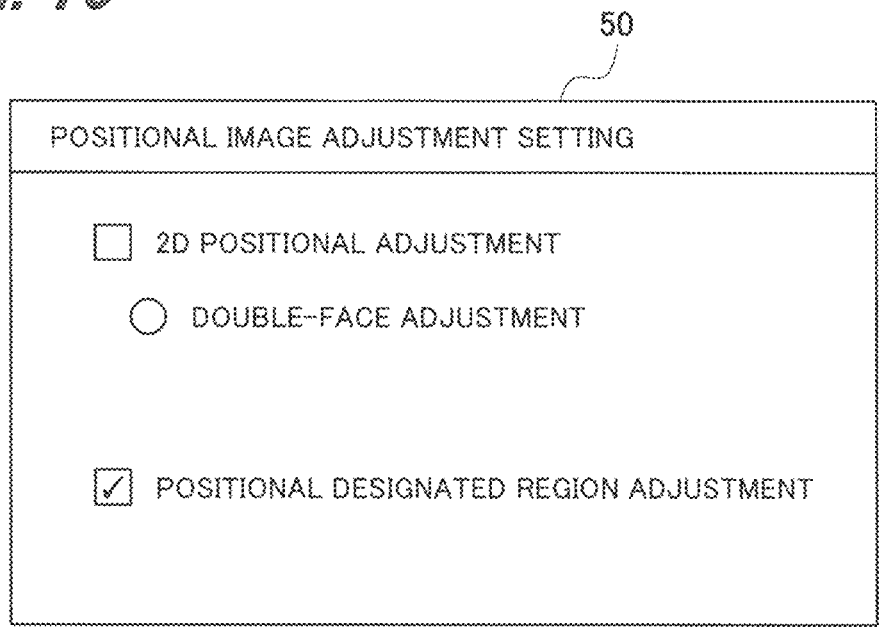
FIG. 10 is an explanatory view of an example of a screen for adjustment setting of the image position applicable to the respective embodiments of the present invention.

FIG. 10 is an explanatory view of an exemplified positional image adjustment setting screen used in the respective embodiments as described above. A positional image adjustment setting screen 50 as shown in FIG. 10 displays a "2D positional adjustment" checkbox and a "positional designated region adjustment" checkbox. When the check mark is input in the "2D positional adjustment" checkbox, the image processing section 16 executes the 2D positional adjustment.

Figure 12:
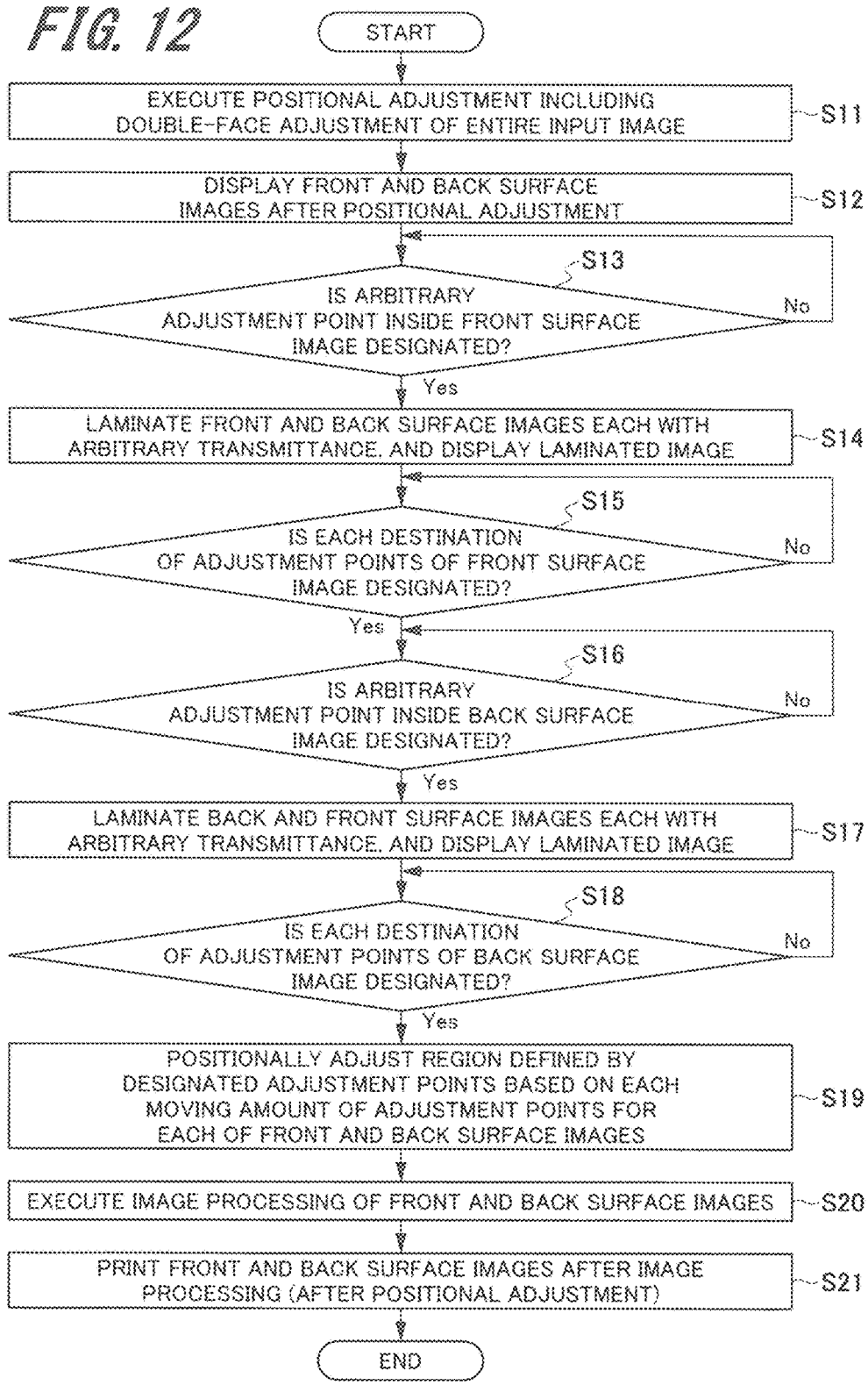
FIG. 12 is a flowchart representing the image processing procedure to be executed by the image processing section according to a fourth embodiment of the present invention.

As a sub-menu for the 2D positional adjustment, "double-face adjustment" is displayed. Upon selection (click) of the radio button of the "double-face adjustment", the double-face adjustment is executed. When the check mark is input in the "positional designated region adjustment" checkbox displayed on the operation display section 14, the image processing section 16 executes the designated position adjustment for adjusting the position of the region defined by the designated adjustment points. If the user desires the image processing in association with the double-face adjustment to be described later as represented by FIG. 12, the user sets the radio button for the "double-face adjustment" ON.

[Image Processing Method]

Figure 11:
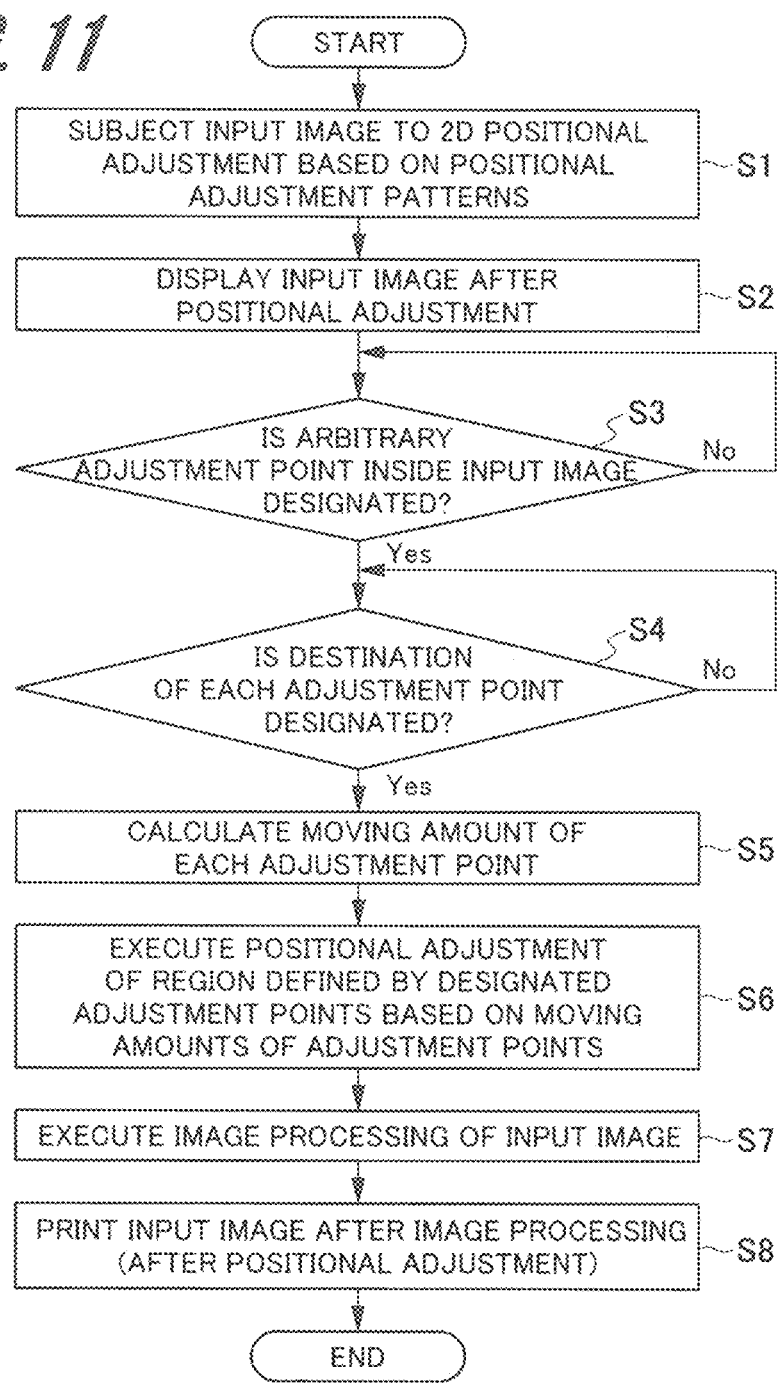
FIG. 11 is a flowchart representing the image processing procedure to be executed by the image processing section according to the first to the third embodiments of the present invention.

FIG. 11 is a flowchart representing the procedure for an image processing method executed by the image processing section 16 according to the first to the third embodiments. Based on positions of the positional adjustment patterns T1 to T4 printed on the sheet of paper, the positional adjustment unit 43 of the image processing section 16 subjects the read image data of the input image Im to the 2D positional adjustment (S1). If it is programmed not to execute the 2D positional adjustment before execution of the positional adjustment of the region defined by the designated adjustment points in step S6 (that is, the "2D positional adjustment" checkbox as shown in FIG. 10 is not checked), execution of this step is omitted. The user is allowed to select the desired adjustment process in reference to the positional image adjustment setting screen 50 as shown in FIG. 10.

At the end of the 2D positional adjustment executed by the positional adjustment unit 43, the CPU 11 displays the 2D positionally adjusted input image on the display unit 142 of the operation display section 14 (S2). Then the designated position reception unit 41 determines whether or not an arbitrary adjustment point inside the input image has been designated through the operation unit 141 (S3). If the adjustment point has not been designated (NO in S3), the determination process is repeatedly executed.

If it is determined that the adjustment point has been designated in step S3 (YES in S3), the designated position reception unit 41 determines whether or not each destination of the respective adjustment points has been designated (S4). If the destinations of the respective adjustment points have not been designated (NO in S4), the determination process is repeatedly executed.

If it is determined that the destinations of the respective adjustment points have been designated in step S4 (YES in S4), the moving amount calculating unit 42 calculates each moving amount of the respective adjustment points (S5). Then the positional adjustment unit 43 executes the process of positionally adjusting the region defined by the designated adjustment points (deforming shape of the region) based on each moving amount of the respective adjustment points (S6). Thereafter, the positional adjustment unit 43 executes the image processing (positional adjustment) for the part except the region defined by the designated adjustment points inside the input image (S7).

The image forming section 17 prints the input image after the image processing (after positional adjustment) executed by the image processing section 16 (S8). Upon termination of the printing operation in step S8, execution of the process of the flowchart ends.

4. Fourth Embodiment

A fourth embodiment is exemplified as the case that the image processing method according to the present invention is applied to the double-face adjustment. The image processing method according to the fourth embodiment will be described referring to FIGS. 12 and 13.

[Image Processing Method]

FIG. 12 is a flowchart representing the procedure for the image processing method executed by the image processing section 16 according to the fourth embodiment. Based on positions of the positional adjustment patterns T1 to T4 printed on the front and back surfaces of the sheet of paper, the positional adjustment unit 43 of the image processing section 16 subjects the respective read image data of the input images both on the front surface (first input image) and on the back surface (second input image) of the sheet of paper to the 2D positional adjustment including the double-face adjustment (S11). If it is programmed not to execute the 2D positional adjustment before execution of the positional adjustment of the region defined by the designated adjustment points in step S19 (that is, the "2D positional adjustment" checkbox as shown in FIG. 10 is not checked), execution of this step is omitted. Hereinafter, the input image on the front surface will be called "front surface image", and the input image on the back surface will be called "back surface image".

Upon termination of the 2D positional adjustment including the double-face adjustment executed by the positional adjustment unit 43, the CPU 11 displays both the front surface image and the back surface image, which have been subjected to the 2D positional adjustment on the display unit 142 of the operation display section 14 (S12). The displayed images are RIP images obtained by subjecting the input images to the RIP process, or the images read by the reader apparatus 20 for adjustment purpose.

The designated position reception unit 41 determines whether or not the operation unit 141 has designated arbitrary adjustment points (for example, four points) inside the front surface image (S13). If the adjustment points have not been designated (NO in S13), the determination process is repeatedly executed. If it is determined that the adjustment points have been designated in step S13 (YES in S13), the image processing section 16 laminates the front surface image set as the image with arbitrary transmittance, and the back surface image set as the image with arbitrary transmittance so that the laminated image of the front and the back surface images is displayed (S14). For example, the use of alpha blending technique allows execution of the above-described display process. It is possible to select the display mode between the one in which the laminated image of the front and the back surface images is displayed, and the one in which the image of only the region of the front surface image enclosed by the designated adjustment points is laminated on the back surface image so as to be displayed.

Figure 13:
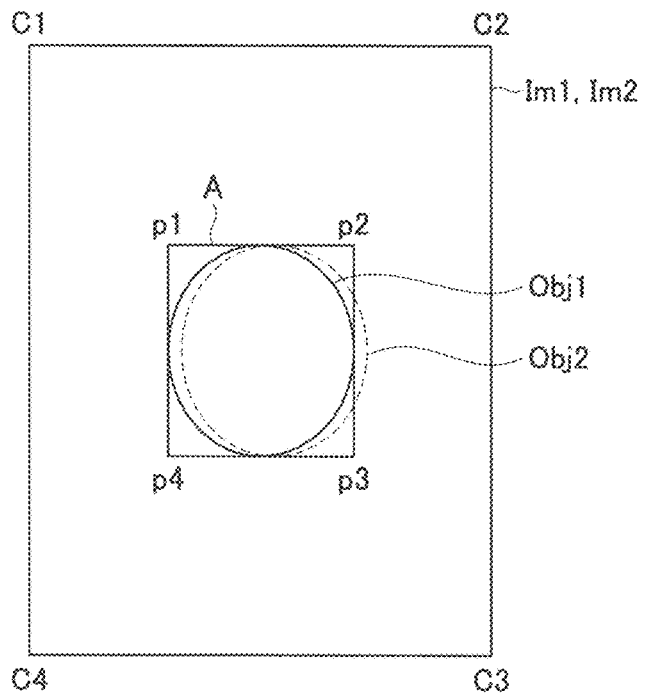
FIG. 13 is an explanatory view representing that front and back surface images are laminated and displayed by executing the image processing procedure as represented by FIG. 12.

The mode for displaying the front surface image and the back surface image will be described referring to FIG. 13. FIG. 13 shows an example that the front surface image and the back surface image are laminated and displayed. The display unit 142 displays the image derived from laminating a front surface image Im1 and a back surface image Im2 each with the predetermined transmittance. As an image object Obj1 inside the front surface image Im1 and an image object Obj2 inside the back surface image Im2 as indicated by the broken line are laminated and displayed, the user is allowed to confirm correlated positions of the image objects Obj1 and Obj2. The user is capable of easily designating the adjustment points p1 to p4 which define the region A that encloses the image object Obj1 inside the front surface image Im1, and adjusting so as to positionally correspond the image object Obj1 inside the front surface image Im1 with the image object Obj2 inside the back surface image Im2.

Referring to the flowchart of FIG. 12, after execution of the process in step S14, the designated position reception unit 41 determines whether or not destinations of the respective adjustment points inside the front surface image have been designated (S15). If the designations of the respective adjustment points have not been designated (NO in S15), the determination process is repeatedly executed. If it is determined that the destinations of the respective adjustment points inside the front surface image have been designated in step S15 (YES in S15), the moving amount calculating unit 42 calculates each moving amount of the respective adjustment points.

The designated position reception unit 41 determines whether or not the operation unit 141 has designated arbitrary adjustment points inside the back surface image (S16). If the adjustment points have not been designated (NO in S16), the determination process is repeatedly executed. If it is determined that the adjustment points have been designated in step S16 (YES in S16), the image processing section 16 laminates the back surface image set as the image with arbitrary transmittance, and the front surface image set as the image with arbitrary transmittance so that the laminated image of the back and the front surface images is displayed (S17). The back surface image and the front surface image in this case are displayed while being inverted from those displayed in step S12. It is possible to select the display mode between the one in which the laminated image of the back and the front surface images is displayed, and the one in which the image of only the region of the back surface image enclosed by the designated adjustment points is laminated on the front surface image so as to be displayed.

The designated position reception unit 41 determines whether or not destinations of the respective adjustment points inside the back surface image have been designated (S18). If the destinations of the respective adjustment points have not been designated (NO in S18), the determination process is repeatedly executed. If it is determined that the destinations of the respective adjustment points inside the back surface image have been designated in step S18 (YES in S18), the moving amount calculating unit 42 calculates each moving amount of the respective adjustment points.

Figure 15:
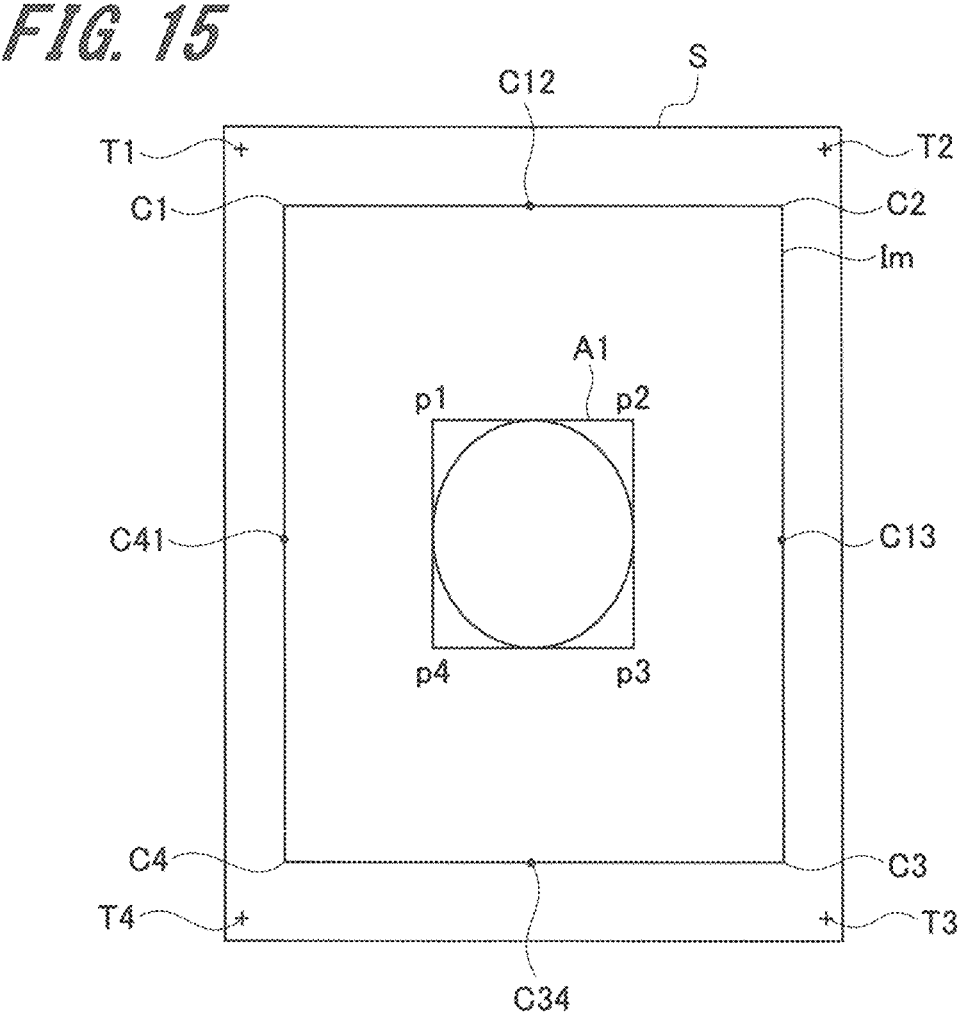
FIG. 15 is an explanatory view representing the image processing method according to another modified example of the first to the fourth embodiments of the present invention.

Based on each moving amount of the respective adjustment points designated for each of the front surface image and the back surface image, the positional adjustment unit 43 executes the process of positionally adjusting (deforming shape of the region) the region defined by the respective adjustment points (S19). Then the positional adjustment unit 43 executes the image processing (positional adjustment) of the part except the region defined by the designated adjustment points inside the front surface image and the back surface image, respectively (S20). In steps S19 and S20, the positional adjustment unit 43 reflects the positional correction values that cover the double-face adjustment of the entire input images (front surface image and the back surface image) in the reference points of the 2D positional adjustment while considering the moving amounts of the designated adjustment points. Then the position of the region defined by the respective adjustment points is adjusted. It is possible to use the four corners of the input image, or points set on the lines formed through connection of the four corners as the reference points of the 2D positional adjustment as shown in FIG. 15.

The image forming section 17 prints the front surface image and the back surface image after the image processing (positional adjustment) executed by the image processing section 16 (S21). Upon termination of printing the front surface image and the back surface image in step S21, the process shown in the flowchart ends.

If the double-face adjustment is not executed, execution of steps from S16 to S18 may be omitted.

The fourth embodiment as described above provides the effect similar to that of the first embodiment. In the fourth embodiment, the user designates the arbitrary adjustment points inside the front surface image and the back surface image, respectively through the operation unit 141, and designates destinations of the designated adjustment points. This makes it possible to adjust the correlated positions between the desired regions inside the front surface image and the back surface image (image object is included) within the shorter adjustment period. This embodiment allows a plurality of adjustment points which define the designated regions both inside the front and the back surface images to be positionally adjusted to the desired positions, respectively.

5. Modified Examples

First Modified Example

Figure 14:
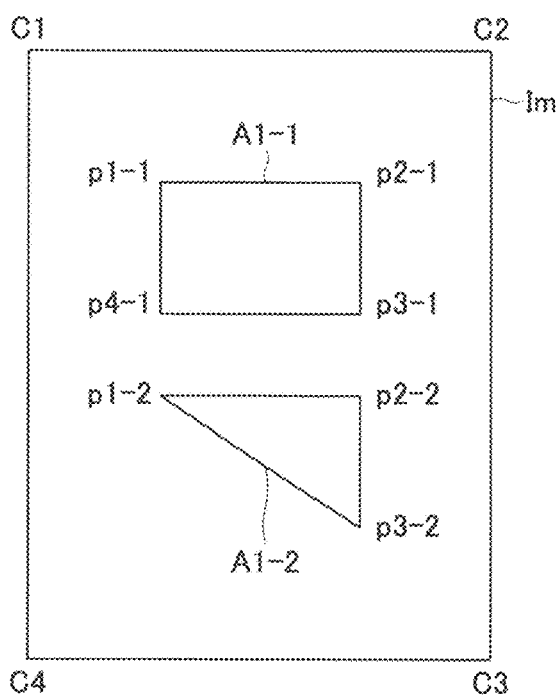
FIG. 14 is an explanatory view representing a modified example of the first to the fourth embodiments of the present invention, in which a plurality of regions are designated.

FIG. 14 is an explanatory view of a first modified example of the above-described first to the fourth embodiments, representing the case that a plurality of regions are designated. As FIG. 14 shows, the operation unit 141 is configured to allow designation of a plurality of regions each defined by three or more arbitrary number of the adjustment points inside the input image based on the user's input operation.

Referring to the example shown in FIG. 14, two regions, specifically, a rectangular region A1-1 and a triangular region A1-2 are designated so that those regions are longitudinally aligned inside the input image Im. The rectangular region A1-1 is defined by adjustment points p1-1 to p4-1, and the triangular region A1-2 is defined by adjustment points p1-2 to p3-2. The image processing section 16 executes the positional adjustments of the regions A1-1 and A1-2 designated by the user concurrently or sequentially.

Second Modified Example

FIG. 15 is an explanatory view of an image processing method according to another modified example of the above-described first to the fourth embodiments. As FIG. 15 shows, the image processing section 16 may be configured to execute the positional adjustment of an attention region in reference to the four corners C1 to C4 of the input image Im, and a plurality of points on the respective lines formed through connection of the four corners C1 to C4. Referring to FIG. 15, for example, a midpoint C12 between the corners C1 and C2, a midpoint C23 between the corners C2 and C3, a midpoint C34 between the corners C3 and C4, and a midpoint C41 between the corners C4 and C1 are added as the reference points. In this way, it is possible to use not only the four corners of the input image but also any other points as the reference points upon execution of the 2D positional adjustment.

Although embodiments of the present invention have been described and illustrated in detail, the disclosed embodiments are made for purposes of illustration and example only. The present invention may be arbitrarily applied or modified in various ways without being limited to the above-described embodiments so long as it does not deviate from the scope of the present invention in the appended claims.

In the above-described embodiments, structures of the apparatus and the system have been described in detail referring to examples for easy understanding of the present invention. They do not necessarily have to include all the structures as described above. It is possible to replace a part of the structure of one embodiment with the structure of another embodiment. The above-described one embodiment may be provided with an additional structure of another embodiment. It is further possible to add, remove, and replace the other structure to, from and with a part of the structure of the respective embodiments.

The respective structures, functions, processing sections, processing devices and the like may be realized through hardware by designing those constituent elements partially or entirely using the integrated circuit. The respective structures and functions may also be realized through software by interpreting and executing the program that allows the processer (for example, CPU 11) to implement the respective functions. Information on the program, table, file and the like for realizing the respective functions may be stored in the storage unit such as the memory, hard disk, and SSD (Solid State Drive), or a recording medium such as the IC card, SD card, and DVD.

REFERENCE SIGNS LIST

1 image forming system
10 image forming apparatus
11 CPU
14 operation display section
16 image processing section
17 image forming section
20 reader apparatus
30 client terminal
41 designated position reception unit
42 moving amount calculating unit
43 positional adjustment unit
141 operation unit
142 display unit

What is claimed is:

1. An image forming apparatus comprising:
   an image forming section capable of forming an image on a sheet of paper based on an input image;
   a display section for displaying the input image;
   an operation section which receives a user's input operation to designate three or more points inside the input image displayed on the display section as adjustment points, and designates at least one destination of the three or more adjustment points; and
   an image processing section which calculates each moving amount of the adjustment points from position information on the at least one destination of the adjustment points designated by the operation section so as to adjust a position of an image of a region enclosed by the three or more adjustment points.

2. The image forming apparatus according to claim 1, wherein the image processing section calculates each moving amount of four corners of the input image from the position information on the at least one destination of the adjustment points designated by the operation section so as to adjust positions of the four corners based on the moving amounts of the four corners.

3. The image forming apparatus according to claim 1, wherein:

the operation section designates four corners of the input image as adjustment points based on the user's input operation, and designates destinations of the adjustment points; and the image processing section calculates moving amounts of the four corners from position information on the at least one destination of the four corners of the input image designated by the operation section, and adjusts positions of the four corners based on the moving amounts of the four corners.

4. The image forming apparatus according to claim 1, wherein the operation section is allowed to designate a plurality of regions each enclosed by three or more adjustment points inside the input image based on the user's input operation.

5. The image forming apparatus according to claim 1, further comprising a positional deviation detection section that detects each deviation amount of positional adjustment patterns for positional deviation detection from specified positions, the positional adjustment patterns being printed around on four corners of the sheet of paper by the image forming section, wherein the image processing section corrects a position of the input image to be formed on the sheet of paper based on the deviation amounts of the positional adjustment patterns detected by the positional deviation detection section.

6. The image forming apparatus according to claim 1, further comprising a positional deviation detection section that detects each deviation amount of three or more adjustment points inside the input image on the sheet of paper formed by the image forming section from specified positions, wherein the image processing section corrects the position of the input image to be formed on the sheet of paper based on tire deviation amounts of the three or more adjustment points inside the input image, which have been detected by the positional deviation detection section.

7. The image forming apparatus according to claim 1, further comprising a positional deviation detection section that detects a positional image deviation between a first input image formed on a front surface of the sheet of paper and a second input image formed on a back surface of the sheet of paper, both of which have been formed by the image forming section, wherein the image processing section corrects positions of the first input image to be formed on the sheet of paper, and the second input image to be formed on the sheet of paper based on the positional deviation between the first input image and the second input image, which has been detected by the positional deviation detection section.

8. The image forming apparatus according to claim 2, wherein the image processing section executes a positional adjustment in reference to the four corners of the input image and a plurality of points on lines formed through connection of the four corners.

9. The image forming apparatus according to claim 1, wherein:

the input image is a rasterized image formed before image formation executed by the image forming section; and the display section displays the rasterized image.

10. The image forming apparatus according to claim 1, wherein:

the input image is a read image obtained by a reader apparatus that reads the input image formed on the sheet of paper; and the display section displays the read image.

11. The image forming apparatus according to claim 7, wherein:

the image processing section sets the first input image formed on the front surface of the sheet of paper as an image with arbitrary transmittance, and the second input image formed on the back surface of the sheet of paper as an image with arbitrary transmittance; and the display section displays an image derived from laminating the first input image and the second input image, and the operation section designates the adjustment points for the first input image and the second input image based on the user's input operation.

12. An image forming method implemented by an image forming apparatus which allows an image to be formed on a sheet of paper based on an input image, the image forming method comprising:

displaying the input image to be formed on the sheet of paper on a display section:

allowing an operation section to receive a user's input operation to designate three or more positions inside the input image displayed on the display section as adjustment points, and to designate at least one destination of the three or more adjustment points; and calculating each moving amount of the adjustment points from position information on the at least one destination of the adjustment points designated by the operation section, and adjusting a position of an image of a region enclosed by the three or more adjustment points.

* * * * *